United States Patent
Raub et al.

(10) Patent No.: US 8,972,871 B2
(45) Date of Patent: Mar. 3, 2015

(54) SUPPORTING USER INTERACTIONS WITH RENDERED GRAPHICAL OBJECTS

(71) Applicant: Google Inc., Mountain View, CA (US)

(72) Inventors: Susannah Alice Raub, Potts Point (AU); Enoch Chee-Lok Lau, Ultimo (AU)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/860,781

(22) Filed: Apr. 11, 2013

(65) Prior Publication Data
US 2014/0208246 A1 Jul. 24, 2014

Related U.S. Application Data

(60) Provisional application No. 61/754,965, filed on Jan. 21, 2013.

(51) Int. Cl.
*G06F 3/00* (2006.01)
*G06F 3/0481* (2013.01)
*G06F 3/0484* (2013.01)
*G06F 3/048* (2013.01)

(52) U.S. Cl.
CPC ............ *G06F 3/04812* (2013.01); *G06F 3/048* (2013.01); *G06F 3/0484* (2013.01)
USPC .......................................... 715/760; 715/765

(58) Field of Classification Search
CPC ..... G06F 3/0484; G06F 3/048; G06F 3/0481; G06F 3/04817
USPC .......... 715/733, 760, 788, 863, 765; 345/418, 345/419, 473
See application file for complete search history.

(56) References Cited

U.S. PATENT DOCUMENTS

| | | | |
|---|---|---|---|
| 8,212,821 B1 * | 7/2012 | Kopylov et al. | 345/473 |
| 8,468,469 B1 * | 6/2013 | Mendis et al. | 715/863 |
| 2002/0109704 A1 * | 8/2002 | Rajarajan et al. | 345/619 |
| 2004/0128215 A1 * | 7/2004 | Florance et al. | 705/28 |
| 2005/0198571 A1 * | 9/2005 | Kramer et al. | 715/517 |
| 2006/0174209 A1 * | 8/2006 | Barros | 715/764 |
| 2006/0224979 A1 * | 10/2006 | Albrecht et al. | 715/760 |
| 2007/0256003 A1 * | 11/2007 | Wagoner et al. | 715/501.1 |
| 2009/0115785 A1 * | 5/2009 | Grandhi et al. | 345/440 |

(Continued)

OTHER PUBLICATIONS

Pointy, JavaScript Event Handling and z-index, Jan. 15, 2011, Stack Overflow, http://stackoverflow.com/questions/4697129/javascript-event-handling-and-z-index.*

(Continued)

*Primary Examiner* — Tuyetlien Tran
(74) *Attorney, Agent, or Firm* — Marshall, Gerstein & Borun LLP

(57) ABSTRACT

A graphical object is rendered to a pixel buffer, such that a software application executing on a computing device displays the contents of the pixel buffer via a user interface. An invisible element is created and positioned under the cursor in response to detecting that the cursor is positioned over the feature being displayed via the user interface. The software application automatically repositions the invisible element in accordance with a movement of the cursor. A change in the position of the invisible element is determined, and the graphical object is repositioned within the pixel buffer in accordance with the change in the position of the invisible element.

26 Claims, 12 Drawing Sheets

(56) References Cited

U.S. PATENT DOCUMENTS

2010/0057581 A1* 3/2010 Narayanaswami et al. ..... 705/26
2012/0290935 A1* 11/2012 Ihara et al. ................... 715/733

OTHER PUBLICATIONS

Chco, Adding a Page Overlay in JavaScript, Jul. 26, 2010, O'Reilly, http://answers.oreilly.com/topic/1823-adding-a-page-overlayin-javascript/.*

International Search Report and Written Opinion for Application No. PCT/US2014/012056, dated Feb. 12, 2014.

Foster, Change Canvas Image With Javascript, May 26, 2012, Stack Overflow, http://stackoverflow.com/questions/10763229/change-canvas-image-with-javascript.

Xanthir, In HTML 5, How to Positioning a Div Element on Top of a Canvas Element, Apr. 27, 2010, Stack Overflow, http://stackoverflow.com/questions/2671699/in-html-5-how-to-positioning-a-div-element-on-top-of-a-canvas-element.

Lancaster, Displaying Hidden Div on Canvas Position Mousemoves, Jul. 3, 2012, Stack Overflow, http://stackoverflow.com/questions/11312156/displaying-hidden-div-on-canvas-position-mousemoves.

* cited by examiner

SUPPORTING USER INTERACTIONS WITH RENDERED GRAPHICAL OBJECTS

CROSS-REFERENCE TO RELATED APPLICATION

This application claims priority to provisional U.S. application Ser. No. 61/754,965, filed Jan. 21, 2013, entitled "Supporting User Interactions with Pixel-Based Features," the entire disclosure of which is hereby expressly incorporated by reference herein

FIELD OF THE DISCLOSURE

The present disclosure relates generally to supporting user interactions with rendered graphical objects in a software application and, more particularly, supporting user interactions with graphical objects rendered to a pixel buffer in a web browser.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, languages and scripts can access elements in Hypertext Markup Language (HTML) or Extensible Markup Language (XML) documents using the Document Object Model (DOM) Application Programming Interface (API) calls. Generally speaking, DOM is a platform- and language-independent interface that defines a tree structure for a document and specifies access and manipulation methods for elements. For example, a program executing in a web browser, such as a JavaScript, can cause a DOM element to be rendered and specify actions to be carried out in response to mouse events or touchscreen events, such as click, mousemove (indicating movement of the mouse cursor), mouseover (indicating positioning of the mouse cursor over a shape or object), mousedown (indicating that the action button on the mouse is depressed), mouseup (indicating that the action button on the mouse is released), touchdown (indicating contact with a touch surface at a touch point), touchmove (indicating that the touch point moves along the touch surface), touchend (indicating end of contact with the touch surface), etc. As a more specific example, a script can include instructions for "dragging" a DOM element, i.e., repositioning the element on the screen in accordance with the number of pixels by which the mouse moved.

On the other hand, HTML documents also can include as elements drawable regions in which shapes rendered as pixels cannot be individually repositioned in response to mouse events or touchscreen events. For example, HTML standards define a canvas element with height and width attributes to provide scripts with a bitmap canvas, i.e., a pixel buffer corresponding to a drawable region. Scripts and programs can use canvas elements to render two-dimensional (2D) shapes, for example. While a script or program can render multiple shapes into a canvas element, this element does not include any information about the individual shapes

SUMMARY

A software component operating in a web browser (or another suitable software framework) allows the user to manipulate, such as reposition by dragging, a graphical object rendered to a shared pixel buffer ("a pixel-based graphical object") corresponding to a drawable region for which the web browser does not provide an individual access mechanism. A graphical object can include, for example, a shape defined by a set of vertices, letters, characters, photographic image, a combination of such elements, etc. When the software component provides an interactive digital map, the graphical object can be a map feature (or simply "feature"). The shared pixel buffer may be implemented as an HTML canvas element, for example, and may include multiple features or graphics objects. To support user interactions with an individual feature, the software component, referred to herein as "the graphical object management module," appends an invisible element such as an HTML div element with a substantially transparent background to the DOM that listens to mouse and touchscreen events. The invisible element may be appended when the mouse cursor is over the graphical object and deleted when the mouse cursor leaves the graphical object, for example. The graphical object management module processes indications of movement of the invisible element and redraws the graphical object in the pixel buffer in accordance with the movement of the invisible element.

According to one example implementation, a tangible computer-readable medium stores instructions that can be executed on one or more processors in a computing device having a user interface. When executed, the instructions cause the one or more processors to render a graphical object to a pixel buffer, such that a software application executing on the computing device displays the contents of the pixel buffer via the user interface. The instructions further cause the software application to create an invisible element positioned under the cursor in response to detecting that a cursor is positioned over the graphical object displayed via the user interface, such that the software application repositions the invisible element in accordance with a movement of the cursor. Further, the instructions cause the one or more processors to determine a change in the position of the invisible element and reposition the graphical object within the pixel buffer in accordance with the change in the position of the invisible element.

In another example implementation, a tangible computer-readable medium stores instructions that implement a graphical object management module configured to operate in a software framework that provides a drawable region to the graphical object management module, which the software framework displays via a user interface. The graphical object management module, when executed on one or more processors, is configured to render a graphical object to the drawable region, cause the software framework to generate an invisible element positionable in accordance with input received via the user interface, and, in response to the invisible element being repositioned, automatically reposition the graphical object within the drawable region in accordance with a change in the position of the invisible element.

In yet another example implementation, a method for supporting user interactions with graphical objects rendered as pixels to a pixel buffer is implemented in a computing device. The method includes rendering a graphical object to the pixel buffer, receiving an indication that a cursor is positioned over the graphical object while the contents of the pixel buffer are being displayed on a display device of the computing device, associating an invisible element with the graphical object, wherein the invisible element is repositioned in accordance with the cursor, and repositioning the graphical object in the pixel buffer in accordance with a change in positioning of the invisible element.

BRIEF DESCRIPTION OF THE DRAWINGS

FIG. 3A illustrates a situation in which the mouse cursor is outside the boundaries of the feature, FIG. 3B illustrates a situation in which the mouse cursor enters the boundaries of the feature, FIG. 3C illustrates a situation in which a mousedown event associated with the invisible element is detected, FIG. 3D illustrates a situation in which the invisible element moves according to mousmove events, and the feature is redrawn in response, and FIG. 3E illustrates a situation in which the mouse leaves the feature, and the invisible element is removed;

DETAILED DESCRIPTION

Figure 1:
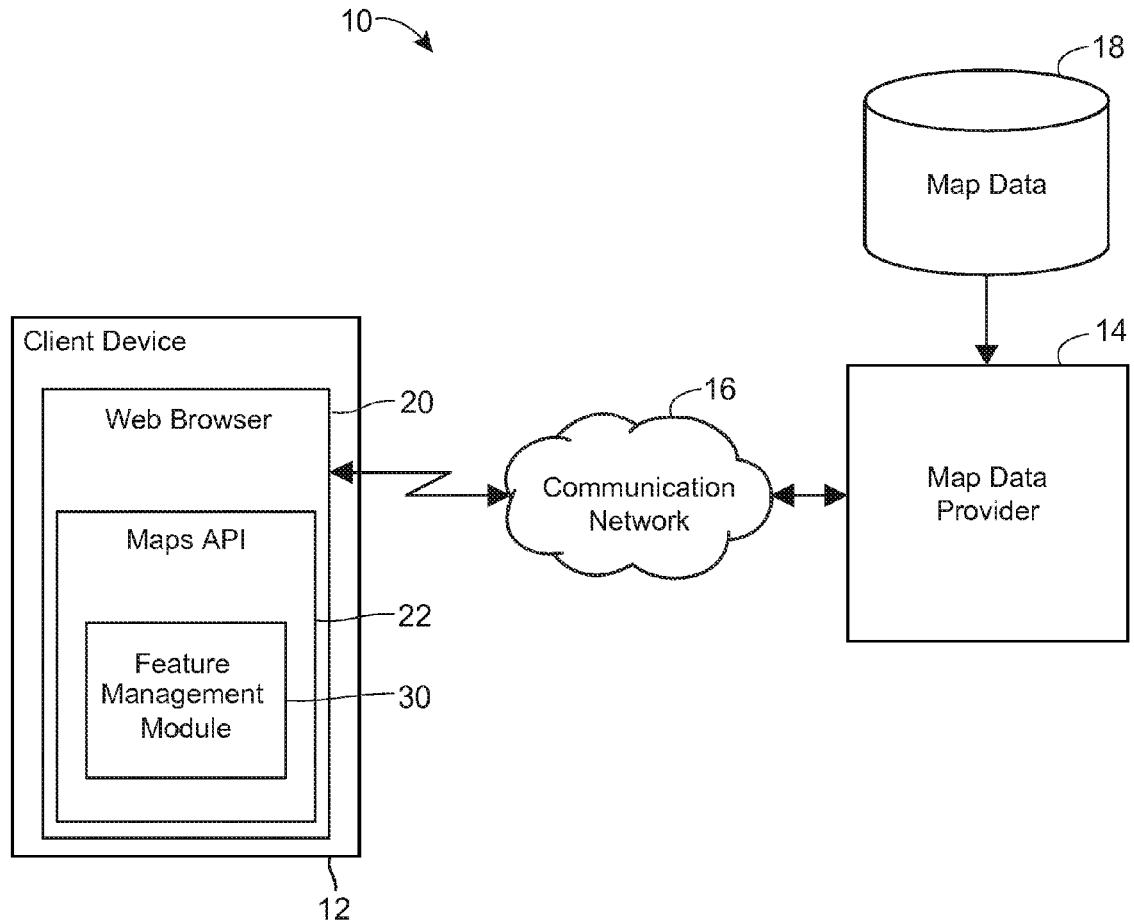
FIG. 1 is a block diagram of an example communication system including a client device that implements the graphical object management techniques of the present disclosure to manage features displayed on a digital map.

In embodiments described below, a graphical object management module operates as a software component in a web browser or another software application to support user interactions with a rendered graphical object for which the software application does not provide a direct access technique. For example, a web browser may provide a shared pixel buffer into which a script or language renders multiple graphical objects in the form of two-dimensional shapes. The graphical object management module allows the user to select and drag an individual graphical object to a new location. To this end, the graphical object management module in an example implementation attaches an invisible element to the DOM to which mouse or touchscreen event listeners are attached. The graphical object management module positions the invisible element under the mouse cursor and, if the DOM detects mouse click events while the mouse cursor is over the graphical object, begins to redraw the graphical object in the pixel buffer in accordance with the movement of the mouse. The graphical object management module stops redrawing the graphical object in accordance with the movement of the mouse when the user releases the mouse button or otherwise deactivates the selection of the graphical object via the invisible element.

As discussed in more detail below, the graphical object management module in some implementations reduces the impact of dragging rendered features on system performance by allowing a single invisible element to be shared among multiple graphical object rendered to a pixel buffer. The graphical object management module may use z-ordering to place the invisible element below the intersecting graphical objects when drag is not in progress, and above these graphical objects when drag is in progress. Further, when the user finishes dragging a graphical object and the cursor at that time ends up over another graphical object, the graphical object management can automatically attach the invisible element to the new graphical object. Although the feature management module alternatively can assign a separate mouse event listener to each draggable graphical object, using a single shared DOM element reduces the overall number of elements.

For simplicity, graphical object management techniques are described below with reference to mouse events. However, it will be understood that these techniques also can be used with touch-based interfaces, such as touchscreen interfaces, for example. As a more specific example, a graphical object management module can process light contact with the touchscreen similarly to mouseover or hover events on a device equipped with a mouse, a tap similarly to mousedown, liftoff similarly to mouseup, etc. Further, the examples below illustrate a web browser that supports an API for providing an interactive digital map. The web browser includes or cooperates with a graphical object management module that operates on features on a digital map and accordingly is referred to below as a "feature management module." In general, however, a graphical object management module can operate in any software system that similarly manages documents and/or provides similar forms of access to pixel buffers. Still further, it will be understood that references to specific conventions, software models, and standards (e.g., DOM, canvas element, div, z-ordering) are provided only as examples.

For further clarity, the techniques of the present disclosure next are discussed with reference to FIGS. 1-8.

First referring to FIG. 1, an example communication system 10 includes a client device 12 that implements at least some of the graphical object management techniques of the present disclosure. The client device 12, which may be a desktop computer, a portable device such as a laptop computer, a tablet computer, etc., receives map data from a map data provider 14 via a communication network 16, which may be wired or wireless. For example, communication network 16 may be a Wide Area Network (WAN) such as the Internet, wireless local area network (WLAN) network, a cellular network, etc. The map data provider 14 in this implementation is a server that communicates with a map database 18. More generally, the map server 14 may be a single computing device having a memory and a processor that executes instructions stored in the memory, a pool of such devices (each capable of processing a request for map data), a group of such devices that processes requests for map data in a distributed manner, etc. The map database 18 similarly may be implemented in any suitable manner on one or multiple physical devices.

A web browser 20 is a software application that displays web pages received from various web servers (such as a web content server 21) via a user interface that can include a monitor, a keyboard, a touchscreen, etc. The web pages can include instructions and other content in a mark-up language such as HTML, embedded images and video content, and scripts in various scripting languages such as JavaScript, for example. The web browser 20 also may invoke a Maps API 22 for retrieving and displaying interactive digital maps within a region which the web browser 20 typically allocates in accordance with the HTML instructions in a web page. In an example scenario, the user or the web page requests a digital map for a specified location (e.g., "San Francisco, Calif.") via user controls of the web browser 20. The Maps API 22 accordingly generates and transmits to the map data provider 14 a request for map data corresponding to the specified location. The map data server 14 in response provides the requested map data to the client device 12, and the software application 20 renders and displays a digital map for the specified location. Depending on the implementation, the map data provider 14 provides map data to the client device 12 in the form of vector data, raster data partitioned into "tiles" of a fixed size, a combination of vector data and raster data, or in any other suitable format. Further, the map data provider 14 may provide map data for generating a 2D map or a 3D map (e.g., vertices defining a mesh and textures).

As one example, the client device 12 can receive, from the web content server 21, HTML content that includes a reference to the Maps API 22 on a Maps API provider 24. The client device 12 accordingly can retrieve the instructions that implement the Maps API 22 and store these instructions in a persistent (e.g., a hard disk) or non-persistent (e.g., RAM) memory. An example implementation of the client device 12 is further discussed with reference to FIG. 8.

The Maps API 22 may be implemented in JavaScript, for example. JavaScript instructions may interact with HTML, XHTML, and other content via DOM API calls. When the web browser 20 receives mouse, touchscreen, or keyboard events from the operating system (OS), the web browser 20 in some cases forwards these events to the Maps API 22. In particular, the OS may allocate a browser window to the web browser 20, and the web browser 20 may in turn allocate a region within the browser window to the Maps API 22. When the user clicks on or mouses over the region controlled by the Maps API 22, the web browser 20 may forward the corresponding to the Maps API 22. In some cases, the web browser 20 also processes these events.

In addition to displaying digital maps, the Maps API 22 may provide additional interactive functionality such as allowing the user to draw over the digital map. In an example scenario, the Maps API 22 displays a digital map of Europe in the assigned region of a browser window and provides a "pencil" tool with which the user can approximately trace an outline of a European country displayed as part of the digital map. The Maps API 22 then generates a map feature based on the trace. The user then drags the outline over to the map of Africa to compare the size of the European country to some African country, for example. More generally, a user can create any number of features of any complexity. Further, in addition to users drawing shapes manually, other software modules as well as the Maps API 22 itself also may specify draggable features displayed over, or as a part of, the digital map.

In at least some implementations, the Maps API 22 draws these and other features to a pixel buffer such as a canvas element. For the reasons discussed above, pixel-based features rendered into a canvas element cannot be individually repositioned using standard DOM element management techniques. To support user operations on individual features, the Maps API 22 includes a feature management module 30 that implements rendered management techniques of the present disclosure. An example implementation of the feature management module 30 is discussed next.

Figure 2:
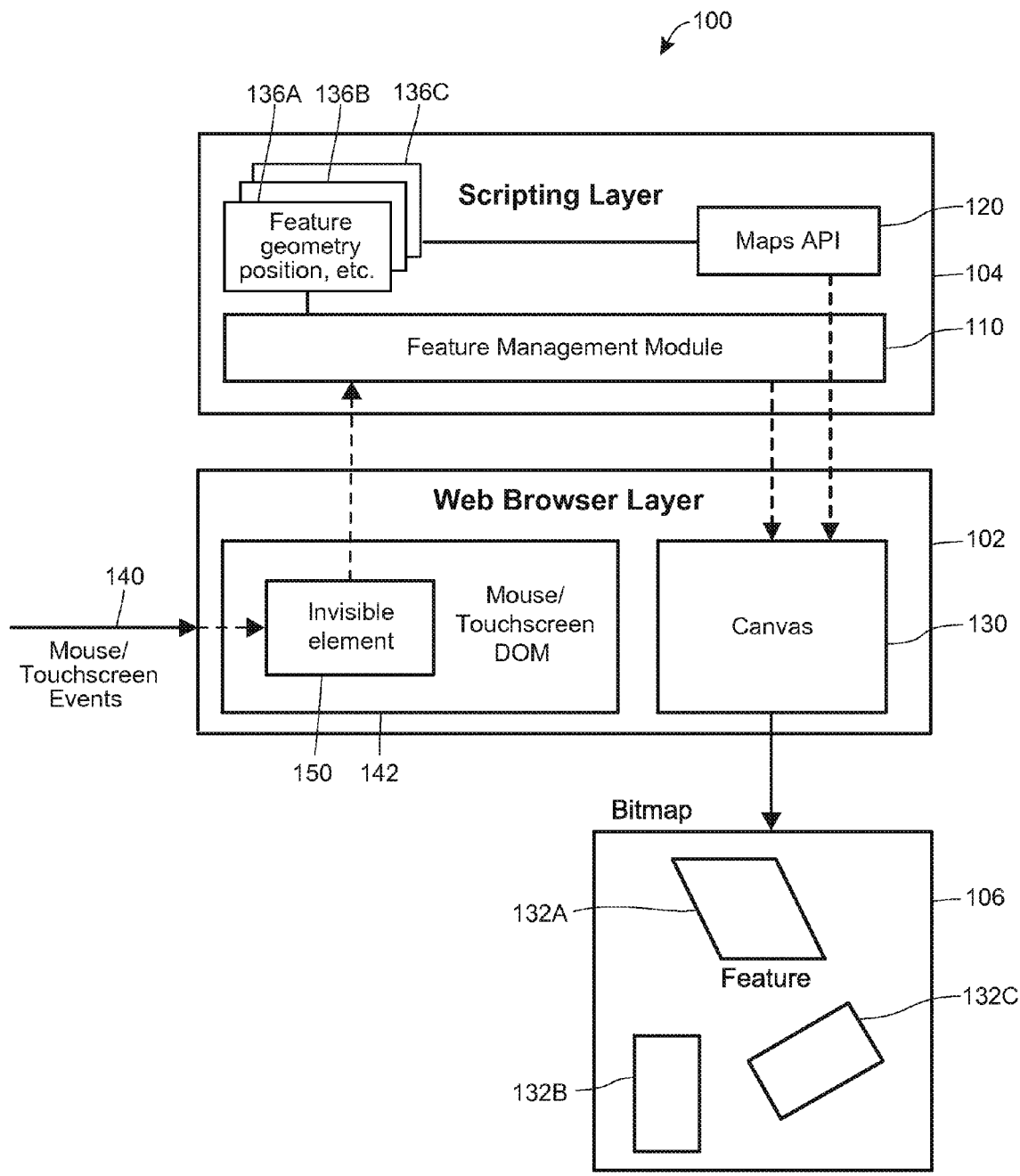
FIG. 2 is a block diagram of an example software system in which a feature management module, implemented as a component of a script executed by a web browser, supports user interactions with a feature rendered into a pixel buffer using an invisible DOM element, according to one embodiment of the present disclosure.

Now referring to FIG. 2, an example software system 100 includes a web browser layer 102 including instructions and data as well as a scripting layer 104 overlaying the web browser 102. In other words, the scripting layer 104 includes data and sets of instructions which the web browser 102 interprets at runtime. The scripting layer 104 may include sets of JavaScript instructions, but need not be limited to only one scripting language. Instructions in the web browser layer 102 can access a bitmap 106, and instructions in the scripting layer 104 can access the bitmap 106 via API calls exposed at the web browser layer 102. The scripting layer 104 includes a feature management module 110, which may be similar to the feature management module 30 of FIG. 1.

In operation, a Maps API 120 obtains from the web browser layer 102 access to a canvas element 130 and draws features 132A-C to the canvas 130 and, ultimately, the bitmap 106 defining a drawable region. The Maps API 120 may be similar to the Maps API 22 discussed above. In the illustrated implementation, the web browser layer 102 has no knowledge regarding the geometry or other properties of the individual features 132A-C. However, the scripting layer 104 stores feature information such as feature geometry, current position, visual properties (e.g., line color), type (e.g., user-defined polygon), etc. related to the respective features in data structures 136A-C.

When the user positions the mouse over the bitmap 106 displayed on the screen, the browser layer 102 receives mouse or touch events 140 via a DOM element 142 from the OS and forwards at least some of these events to the scripting layer 104. When the feature management module 110 determines that the mouse cursor is positioned over one of the features 132A-C based on the geometry and positioning data 136-C, the feature management module 110 creates an invisible element 150 and adds the invisible element 150 to the tree structure of the DOM 142. In an example implementation, the invisible element 150 may be an invisible div element having square geometry, defined in HTML. As illustrated in FIGS. 3A-E, the invisible element 150 may be a relatively small square.

When the user moves the mouse cursor over one of the features 132A-C, the web browser layer 102 repositions the invisible element 150 in accordance with cursor movement. After the invisible element 150 receives a mousedown event, the feature management module 110 begins to process mouse events to which the invisible element 150 listens, and calculates the amount by which one of the features 132A-C must be moved. For example, if the invisible element moves by 10 pixels to the right and 15 pixels down when the invisible element 150 is over the feature 132A and the mouse button is depressed, the feature management module 110 may similarly move the feature 132A by 10 pixels to the right and 15 pixels down. To this end, the feature management module 110 may obtain the geometry of the feature 132A from the data structure 136A and redraw the feature 132A via the canvas element 130.

To illustrate the operation of the feature management module 110 more clearly, an example scenario, according to which a user selects and drags a feature rendered to a canvas element, is discussed with reference to a series of combined screenshot/block diagrams of FIGS. 3A-E.

Figure 3A:
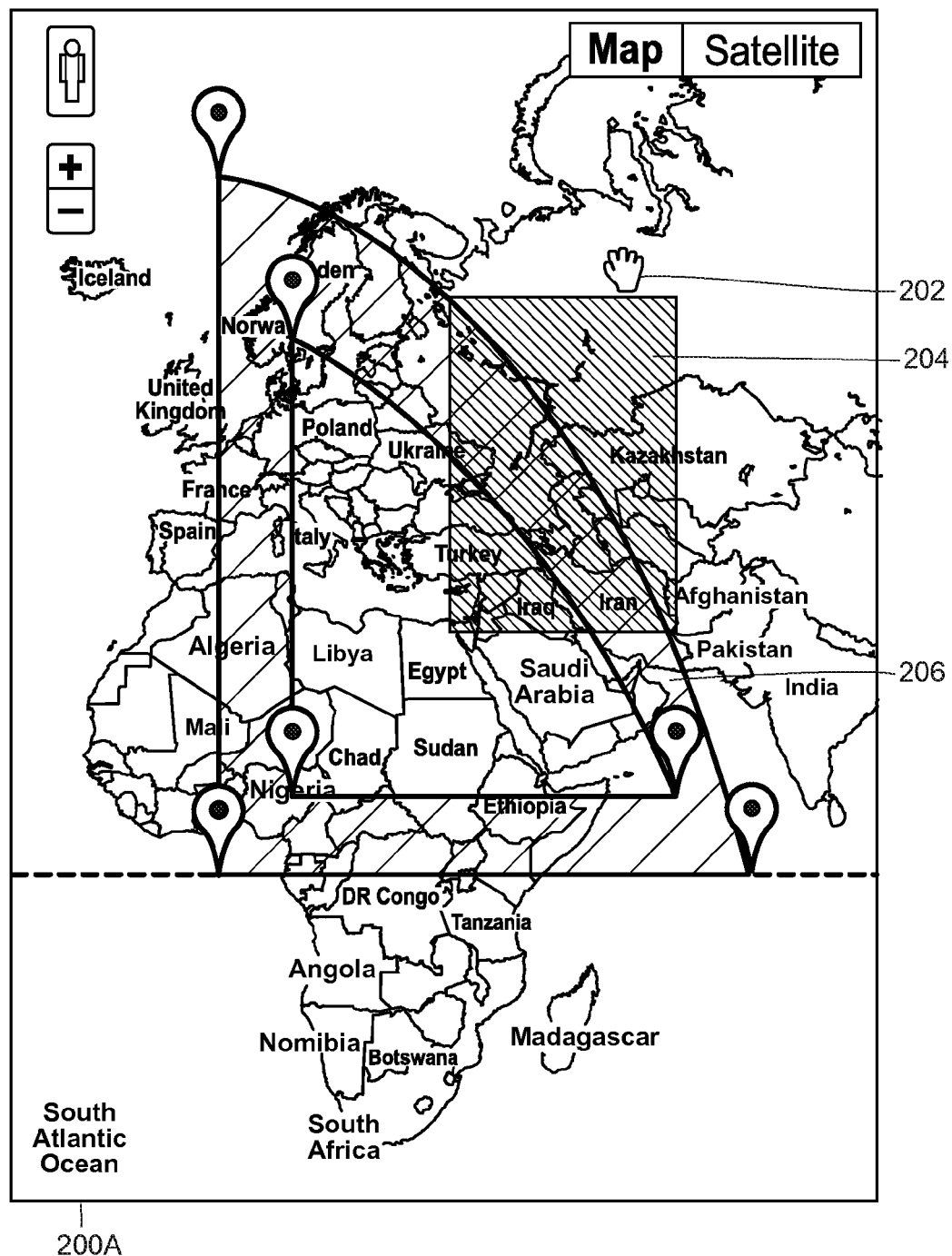
FIGS. 3A-E are combined screenshot/block diagrams that illustrate a scenario in which the software system of FIG. 2 uses an invisible element to drag a feature rendered in a pixel buffer, according to an example implementation.

Referring first to FIG. 3A, a screenshot 200A may be what the Maps API 120 renders in an assigned region within a window controlled by the web browser layer 102. The Maps API 120 may render some or all of the shapes, shapes filled with colors, labels, etc. to the canvas element 130. Further, the user may draw a feature 204 as a simple rectangle and define a more complex shape as a feature 206 using a set of markers. The features 204 and 206 also have fill colors, but in general features need not include fill color. Also, in other scenarios, features may be generated automatically by software modules.

The feature management module 110 analyzes the position of the mouse cursor 202 (e.g., using its x- and y-coordinates) in view of the current position and geometry of the features 204 and 206 and determines that the mouse cursor 202 is outside the boundaries of each of the features 204 and 206. Accordingly, the feature management module 110 does not generate an invisible DOM element to handle mouse events, at this time.

Figure 3B:
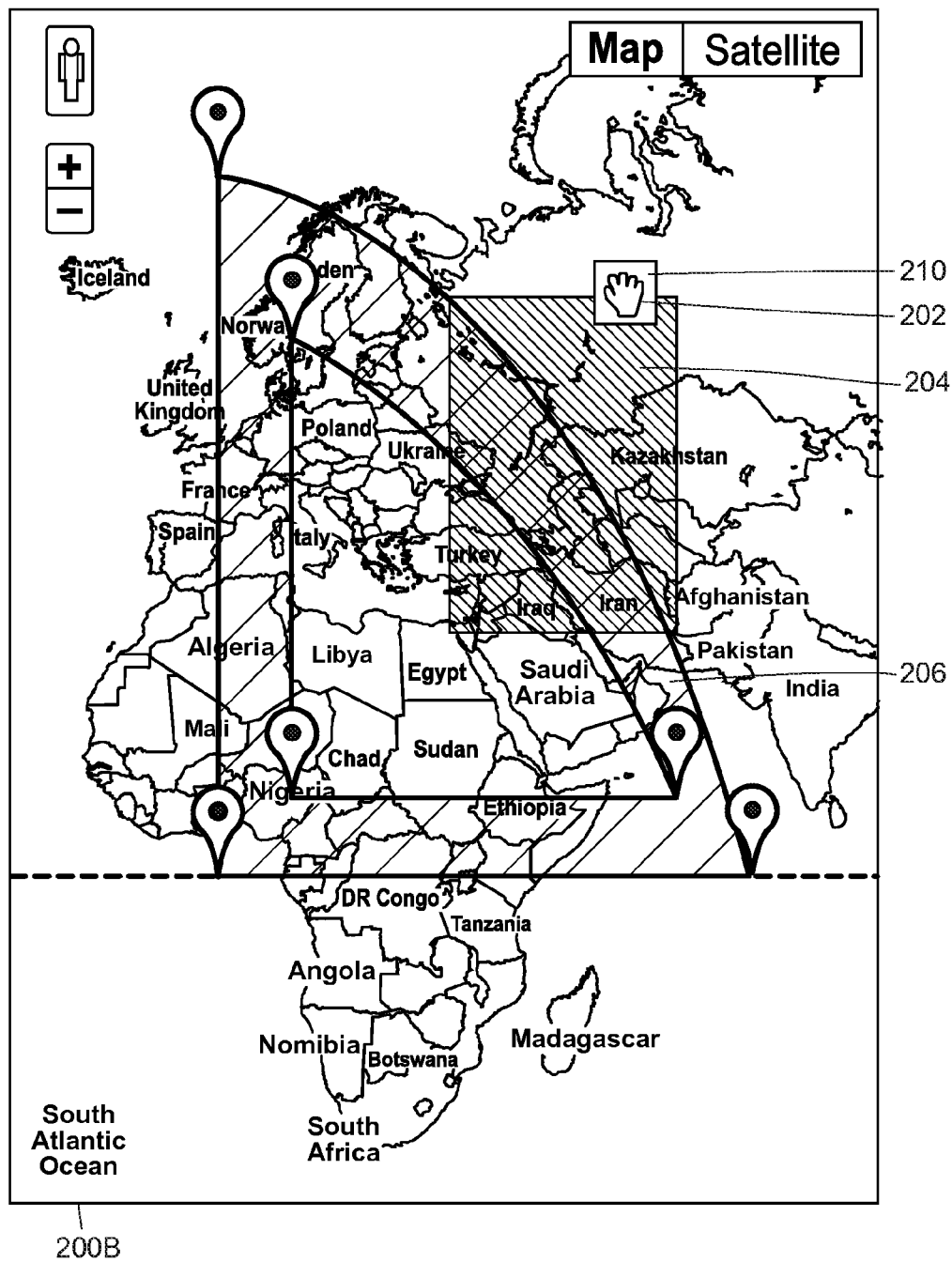

Now referring to FIG. 3B, the screenshot 200B illustrates the features 204 and 206 in the same positions, but now the mouse cursor 202 is positioned over a portion of the feature 204. The feature management module 110 analyzes the new position of the mouse cursor 202 and, in response to determining that the mouse cursor 202 is now positioned above the feature 204, generates the invisible element 150 and attaches the invisible element 150 to the DOM 142. The invisible element 150 listens to mouse events. For clarity, the area covered by the invisible element 150 is schematically illustrated in FIG. 3B as a shaded square 210. However, it will be understood that the area covered by the invisible element 150 is not visible to the user.

In the situation illustrated in FIG. 3B, the feature management module 110 has created the invisible element 150, but the invisible element 150 has not yet received a mousedown event. Accordingly, as the user moves the mouse cursors 202, the position of the feature 204 remains the same.

Figure 3C:
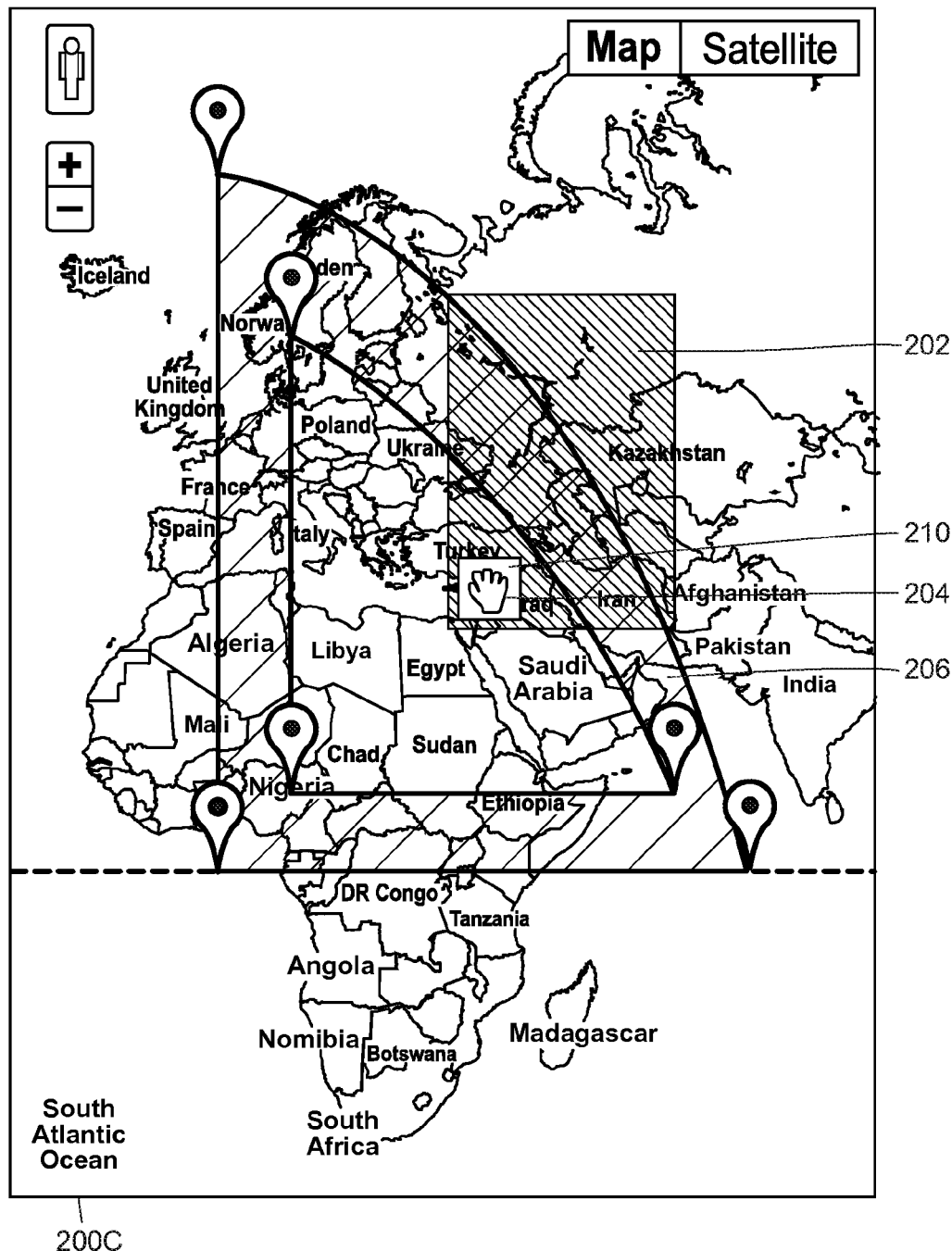
Figure 3D:
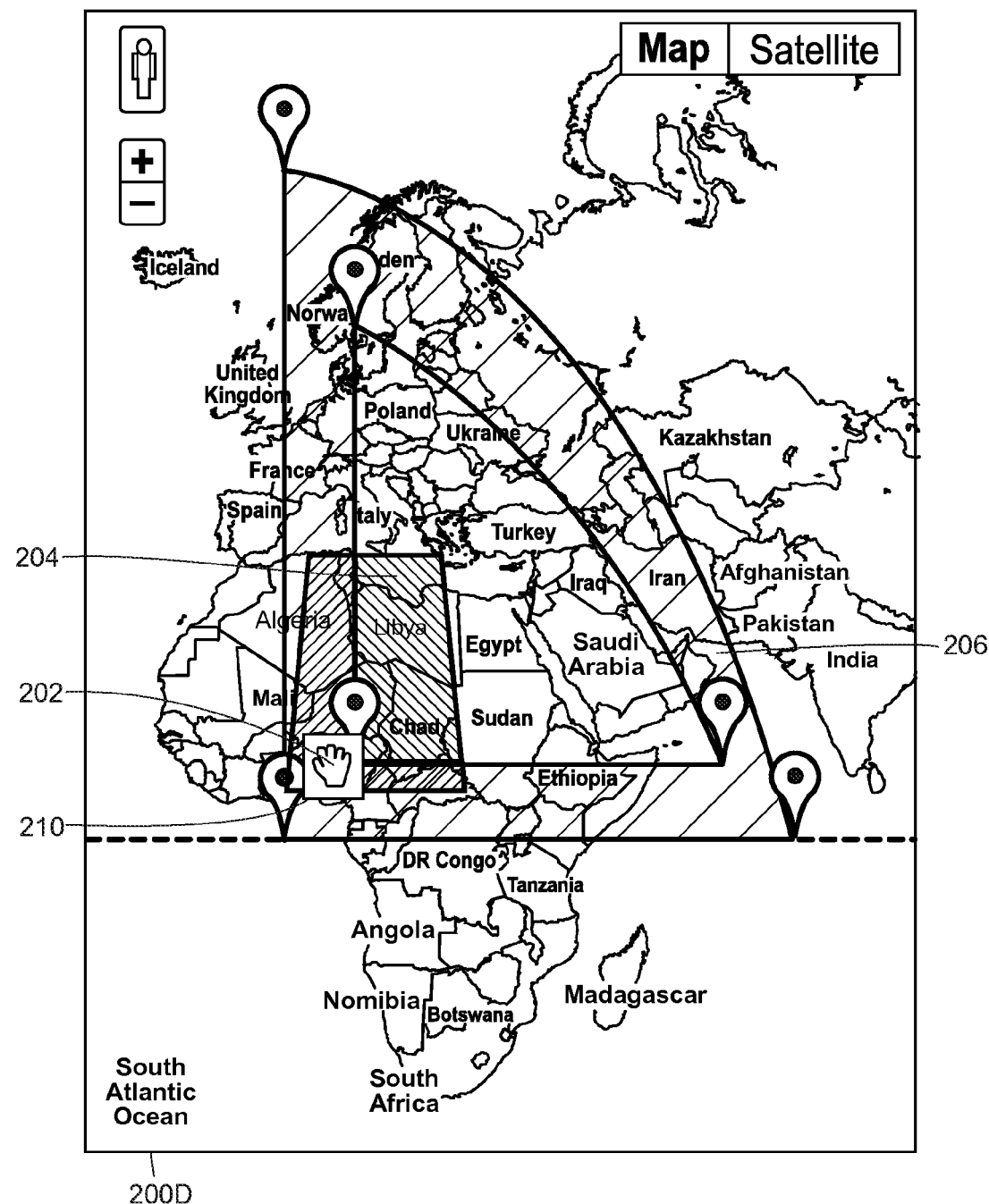

Now referring to FIG. 3C, when the user presses on the action (e.g., left) button on the mouse, the feature management module 110 detects a mousedown event in connection with the invisible element 150. In response, the feature management module 110 records the initial position of the invisible element 150 (represented by the shaded square 210).

As the user moves the invisible element 150 on the screen (see FIG. 3D), the feature management module 110 compares the new position of the invisible element 150 to the initial position and moves the feature 204 by the same amount, so that the user effectively drags the feature 204 in addition to the invisible element 150. More specifically, the feature management module 110 redraws the feature 204 in the canvas element 130.

Figure 3E:
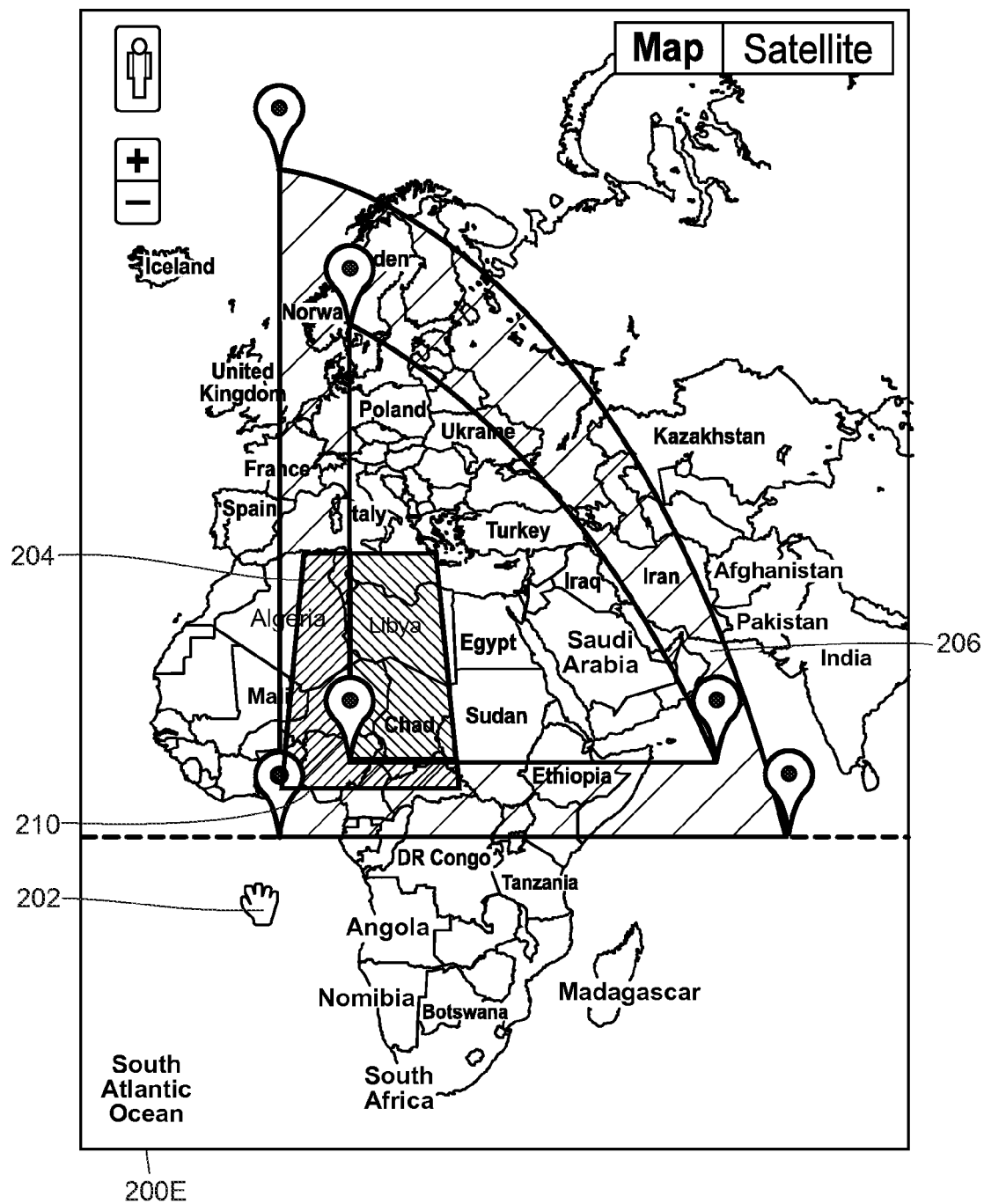

As illustrated in FIG. 3E, after the user releases the action button on the mouse and the corresponding mouseup event is detected, the feature 204 remains in its new position. Further, when the mouse cursors 202 leaves the boundaries of the feature 204 (as well as the feature 206), the feature management module 110 removes the invisible element 150 from the DOM element 142, as represented in FIG. 3E by the removal of the shaded square 210.

Referring generally to FIGS. 2 and 3A-E, the feature management module 110 also dynamically adjusts the z-order value of the invisible element 150 so as to allow this element to move over other elements that are in the same container as the element 150. For example, if the feature 206 is represented by an element, adjusting the z-order value of the element 150 allows the feature 204 to be dragged "through" the feature 206. As best illustrated in FIG. 3A, the respective z-order values of the elements corresponding to the features 204 and 206 are such that the feature 206 is displayed above the feature 204. Accordingly, when a mousedown event is detected as illustrated in FIG. 3C, the feature management module 110 assigns a z-order value to the invisible element 150 that places the invisible element 150 above the element corresponding to the feature 206 (as well as all other elements that may be in the same area). When the corresponding mouseup event occurs as illustrated in FIG. 3E, the feature management module 110 moves the invisible element 150 back to match its z-order value to that of the repositioned feature 204, so as to allow other elements to receive mouse events.

As discussed below with reference to FIG. 5, when the mouse cursor leaves the feature 204 (a mouseout event) and the cursor is now over another feature, the feature management module automatically associates the invisible element with the new feature.

Further, in addition to redrawing a feature in a new location in the canvas element 130, the feature management module 110 also may perform other transformations in view of the extent of movement of the feature. For example, because the feature 204 is drawn over a digital map and represents a large geographic area covering several countries, the feature management module 110 additionally transforms the geometry of the feature 204 in accordance with the curvature of the Earth.

Next, several example methods that may be implemented in a feature management module 110 or a similar module are discussed with reference to FIGS. 4-7.

Figure 4:
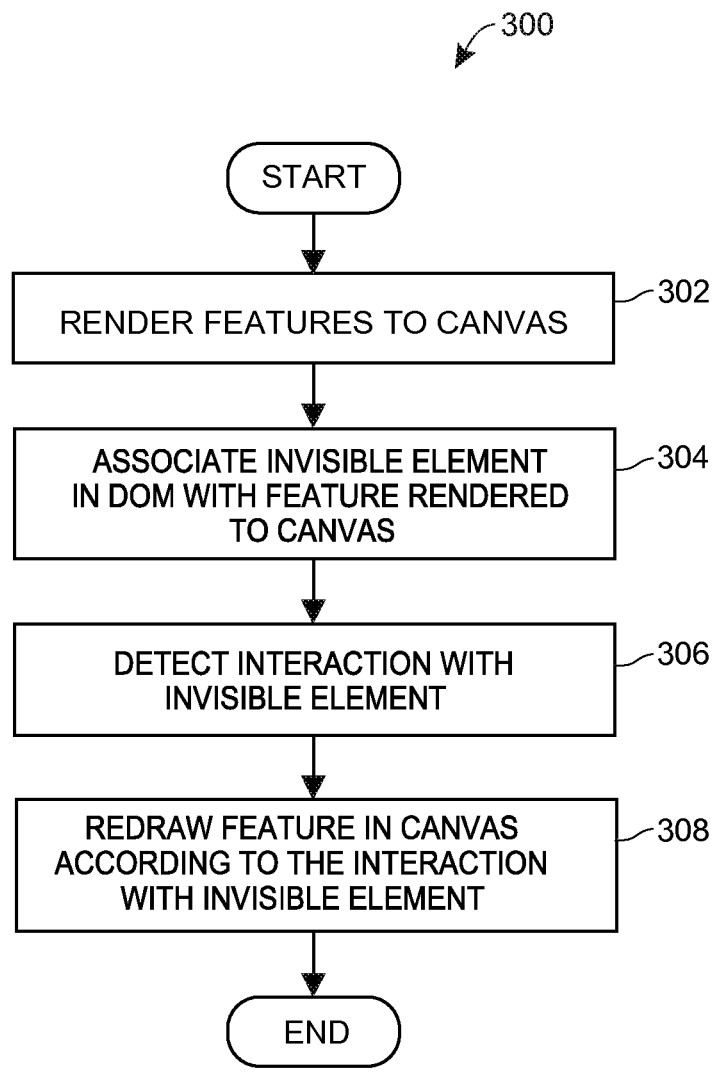
FIG. 4 is a flow diagram of an example method for managing features rendered to a pixel buffer using an invisible element, which the feature management module of FIG. 2 may implement.

FIG. 4 is a flow diagram of an example high-level method 300 for managing features rendered to a pixel buffer using an invisible element. The method 300 begins at block 302, when one or more features are rendered to canvas or another type of pixel buffer. At block 304, an invisible element in a DOM element is associated with a selected feature rendered into the canvas element. The invisible element is configured to listen to mouse and touch events. As discussed above, this association may occur when the mouse cursor, user's finger, etc. enters the boundaries of the feature on the screen. Next, at block 306, user interactions with the invisible element are detected, and the feature is redrawn and otherwise managed according to the interactions with the invisible element (block 308). The method completes after block 308 when the mouse leaves the boundaries of the feature, for example.

Figure 5:
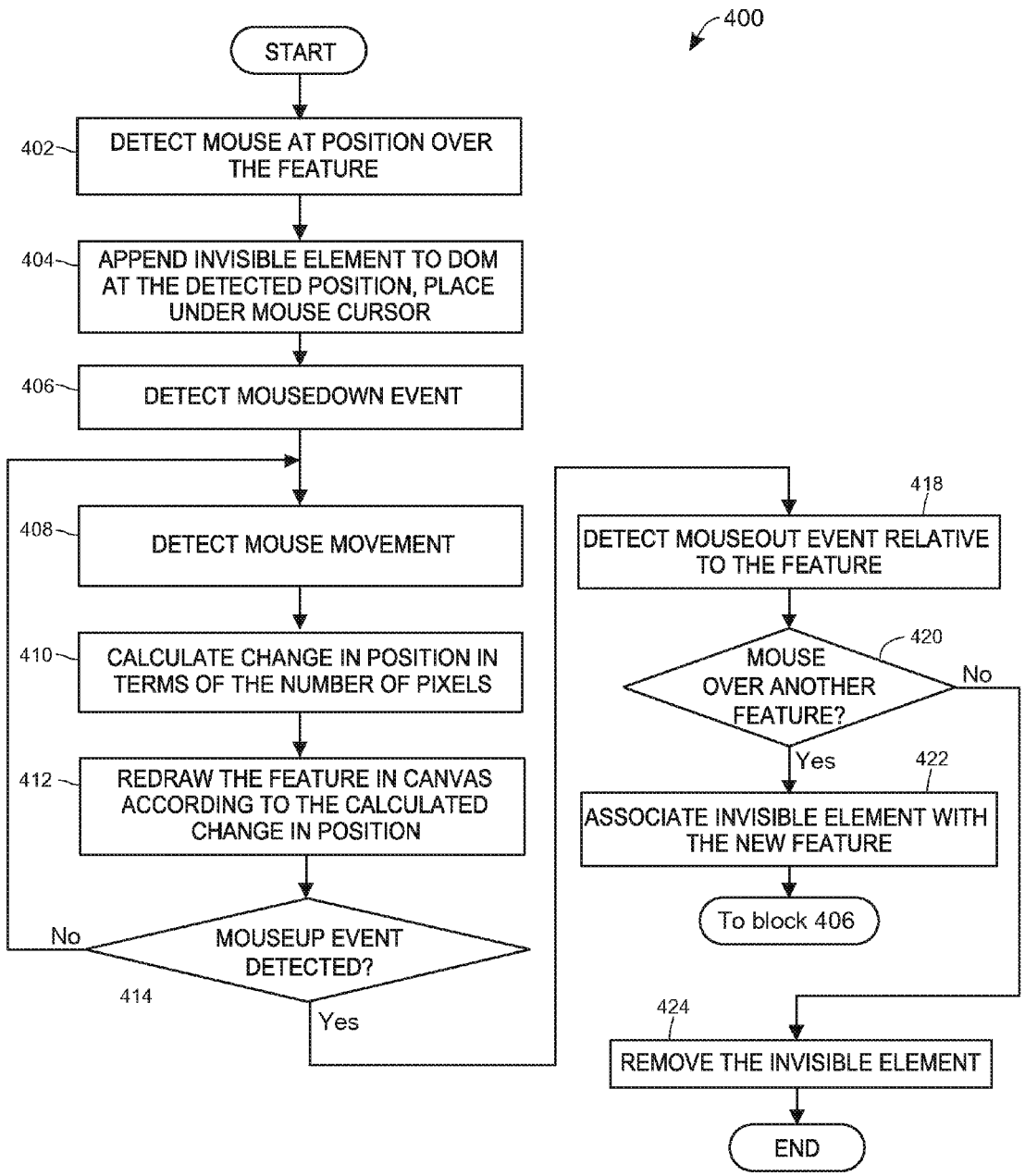
FIG. 5 is a flow diagram of an example method for processing mouse events when an invisible element is used to manage a feature using the techniques of the present disclosure, which the feature management module of FIG. 2 may implement.

FIG. 5 is a more detailed flow diagram of a method 400 for processing mouse events when an invisible element is used to manage a feature using the techniques of the present disclosure, which the feature management module 110 may implement. At block 402, the mouse cursor is detected at a position over a feature rendered to a canvas element. For example, the management module 110 may monitor the position of the mouse cursor whenever the user mouses over the portion of the screen corresponding to the canvas element. An invisible element is appended to the DOM responsible for processing mouse and touchscreen events at block 404. The invisible element is placed under the mouse cursor. Additionally, as discussed below with reference to FIG. 6, the z-order value of the invisible element may be set in view of the z-order values of other features in the canvas element so as to place the invisible element above the features.

At block 406, a mousedown event is detected while the invisible element (and the mouse cursor) is over the feature. More generally, any suitable activation event can be received at block 406. For example, if the method 400 is implemented in a touchscreen device, the activation event can be a double tap gesture. Mouse movement is detected at block 408, and the change in position in terms of the number of pixels is calculated at block 410. In other implementations, the position can be calculated using other techniques. At block 412, the feature then is redrawn in canvas according to the calculated change in position (e.g., by moving the feature in the canvas by the same amount as calculated at block 410).

Until the mouseup event is detected at block 414, the flow proceeds back to block 408. Otherwise, when the mouseup event is detected, the flow proceeds to block 418, where the mouseout event relative to the selected feature is expected. More generally, any suitable deactivation event can be received at block 414. Once the mouse cursor leaves the boundaries of the feature, the current position of the mouse cursor is analyzed relative to other features. If it is determined that the mouse is positioned over another feature (block 420), the flow proceeds to block 422, where the invisible element is associated with the new feature. The flow then returns to block 406 to process manipulation of the newly selected feature.

Otherwise, if the mouse is not positioned over another feature, the flow proceeds to block 424, where the invisible element is removed from the DOM. The method 400 then ends.

Figure 6:
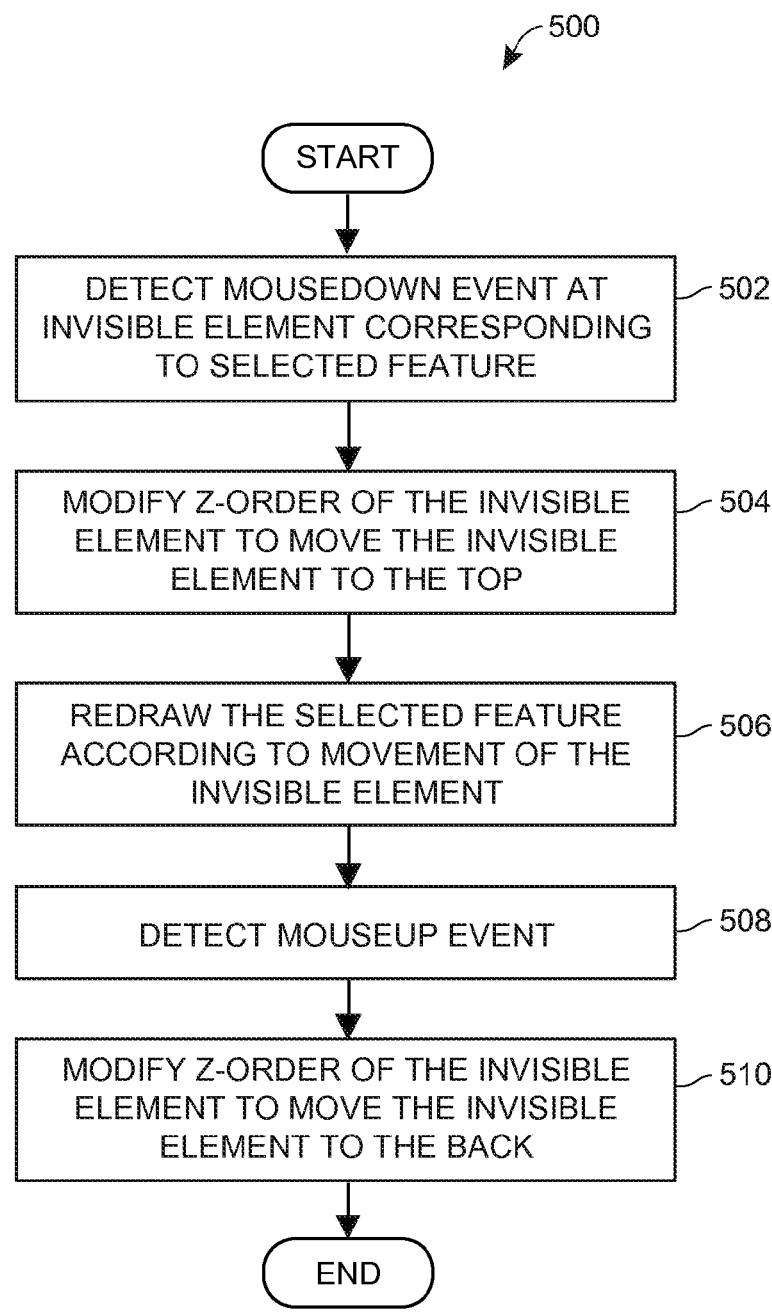
FIG. 6 is a flow diagram of an example method for managing z-order of an invisible element, which the feature management module of FIG. 2 may implement.

Next, the flow diagram of FIG. 6 illustrates an example method 500 for managing z-order of an invisible element, which the feature management module 110 may implement. In some implementations, the feature management module 110 implements the steps of the method 500 along with the steps of the method 400 discussed above. In other words, the feature management module 110 may implement both methods in the same embodiment.

The method 500 starts at block 502, where a mousedown event at an invisible element corresponding to the selected feature is detected. The z-order value of the invisible element is adjusted at block 504 so as to move the invisible element to the top, i.e., above the features or elements in the surrounding area. The selected feature is repositioned at block 506 in accordance with the repositioning of the invisible element (as discussed above with reference to FIG. 5). After a mouseup event associated with the invisible element is detected at block 508, the z-order of the invisible element is again modified to move the invisible element to the back (block 510), and the method 500 completes.

Figure 7:
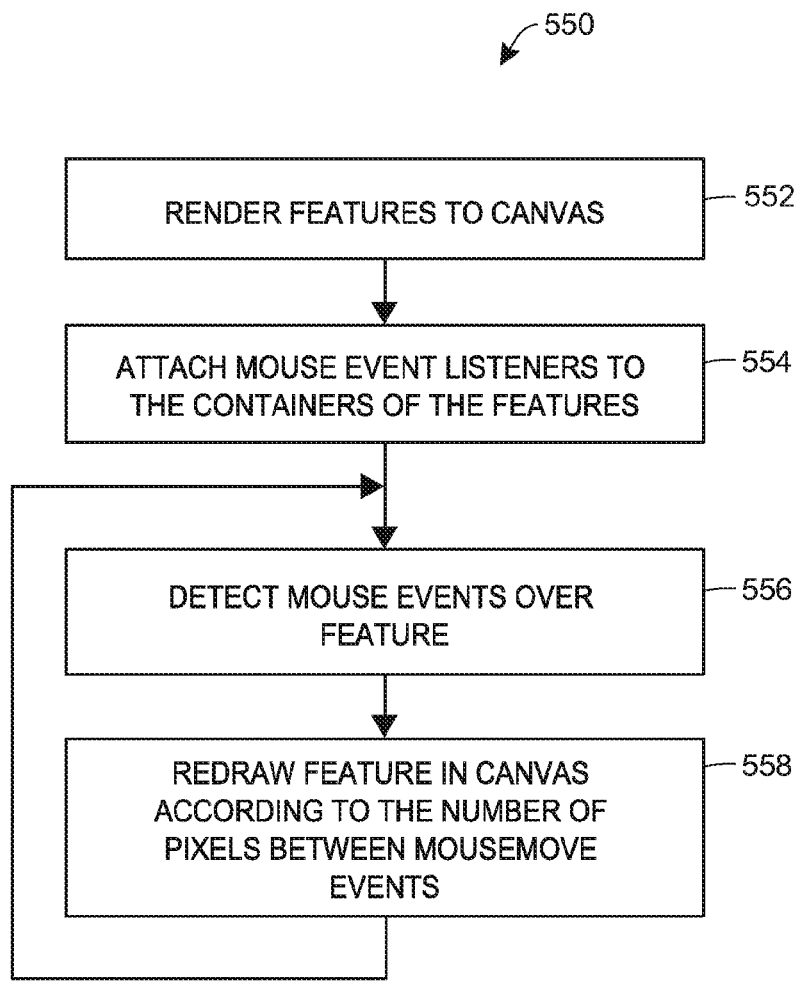
FIG. 7 is a flow diagram of another example method for managing a feature rendered to a pixel buffer using mouse event listeners, which the feature management module of FIG. 2 may implement.

FIG. 7 illustrates an example alternative method 550 for managing a feature rendered to a pixel buffer using mouse event listeners, which the feature management module 110 may implement. At block 552, features are rendered to a canvas element. Separate mouse event listeners then are attached to the containers of these features at block 554. Mouse events are detected over one of the features using the corresponding mouse event listener (block 556), the feature is redrawn in canvas according to the movement of the mouse cursor as reported by the mouse event listener (block 558).

Figure 8:
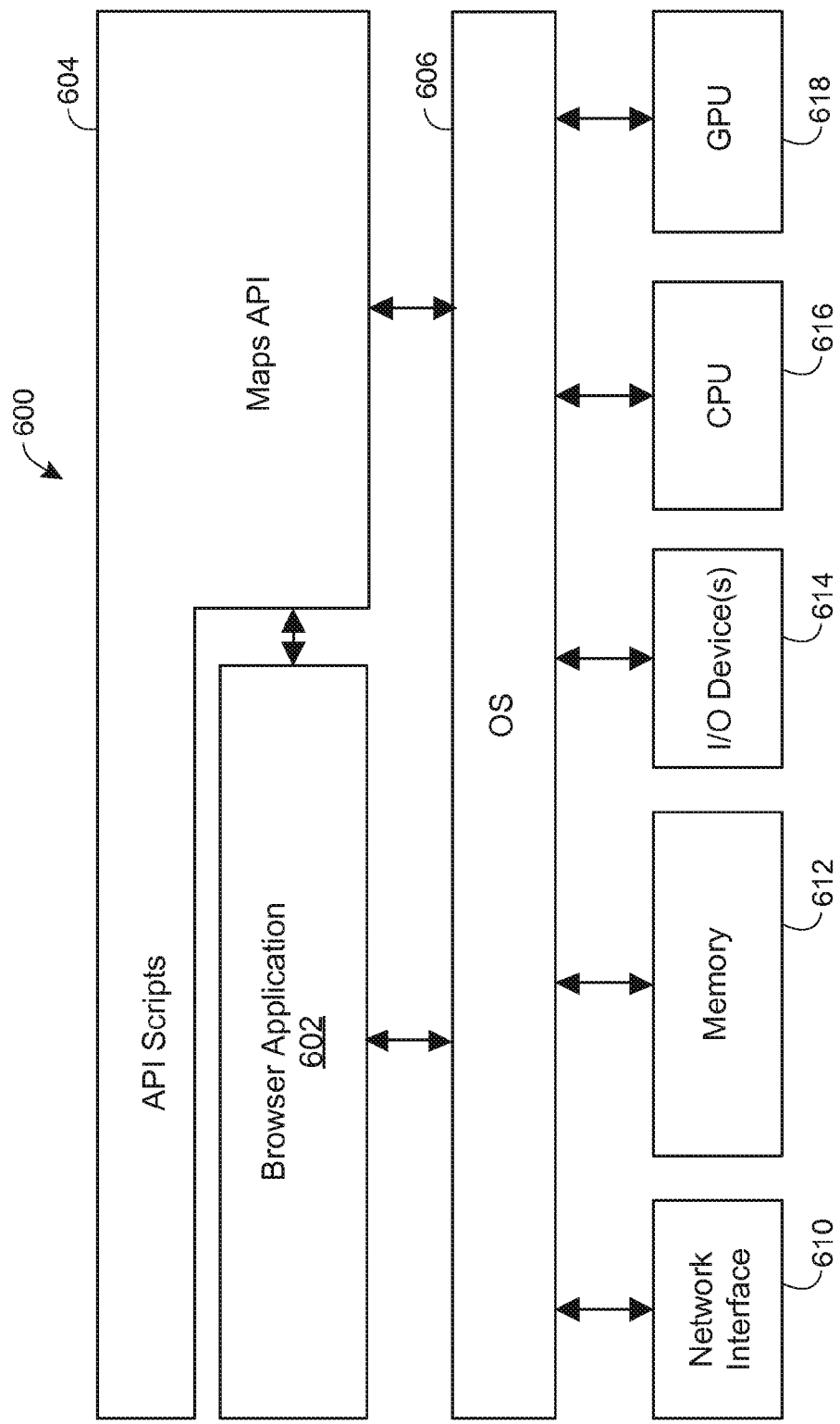
FIG. 8 is a block diagram of an example computing device in which the software system of FIG. 2 may be implemented.

Next, for further clarity, FIG. 8 illustrates an example computing device 600 in which the software system 100 of FIG. 2 may be implemented.

At an software application layer, the computing device 600 includes a browser application 602 and a Maps API 604 that may interact directly with the OS 606 in addition to the browser application 602, according to some implementations. The Maps API 604 also may include instructions in a scripting language such as JavaScript.

The OS 606 can be any suitable desktop or mobile operating system. The OS 606 may access hardware components such as one or more network interfaces 610, a computer-readable memory 612, which in turn may include persistent (e.g., a hard disk, flash) as well as non-persistent components (e.g., RAM), input and output devices 614 such as a keyboard, a mouse, a monitor, a touchscreen, etc. to implement a user interface, one or more processors 616, and one or more graphics processors 618. The application-layer software components 602 and 604, as well as the OS 606, may be stored in the memory 612 and be executed by the one or more processors 616 and, in some cases, the one or more graphics processors 618.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

A hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for supporting user interactions with pixel-based features through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein.

What is claimed is:

1. A tangible non-transitory computer-readable medium storing thereon a set of instructions that, when executed on one or more processors in a computing device having a user interface, cause the one or more processors to:

cause a web browser executing on the computing device to render a web page that includes a pixel buffer in a static position relative to the web page;

render a graphical object to the pixel buffer, wherein the web browser displays the web page and the contents of the pixel buffer via the user interface;

in response to detecting that a cursor is positioned over the graphical object displayed via the user interface, cause the web browser to create an invisible element positioned under the cursor, wherein the web browser automatically repositions the invisible element in accordance with a movement of the cursor;

determine a change in the position of the invisible element;

reposition the graphical object within the pixel buffer in accordance with the change in the position of the invisible element as the position of the invisible element changes, while the pixel buffer remains in a static position relative to the web page; and remove the invisible element when the cursor is no longer positioned over the graphical object.

2. The computer-readable medium of claim 1, wherein the set of instructions further causes the one or more processors to:
receive an activation event in response to a user action applied to the user interface, while the cursor is positioned over the graphical object,
wherein the graphical object is repositioned within the pixel buffer only after the activation event is received.

3. The computer-readable medium of claim 2, wherein the set of instructions further causes the one or more processors to:
receive a deactivation event subsequently to receiving the activation event, and
not reposition the graphical object within the pixel buffer after the deactivation event is received even when the web browser repositions the invisible element.

4. The computer-readable medium of claim 3, wherein:
the activation event is a mousedown event, and
the deactivation event is a mouseup event.

5. The computer-readable medium of claim 3, wherein the set of instructions further causes the one or more processors to:
in response to receiving the activation event, modify a z-order value of the invisible element so as to bring the invisible element above one or more elements within a container shared with the invisible element, and
in response to receiving the deactivation event, modify the z-order value of the invisible element so as to bring the invisible element below the one or more elements.

6. The computer-readable medium of claim 1, wherein the web browser supports Document Object Model (DOM) objects.

7. The computer-readable medium of claim 6, wherein the invisible element is appended to a DOM object and configured to listen to mouse events.

8. The computer-readable medium of claim 6, wherein the web browser provides the pixel buffer via a canvas element that conforms to a Hyper Text Markup Language (HTML) specification.

9. The computer-readable medium of claim 6, wherein the set of instructions render a digital map of a geographic area.

10. The computer-readable medium of claim 9, wherein the graphical object is a map feature rendered over the digital map in accordance with user commands received via the user interface.

11. The computer-readable medium of claim 6, wherein set of instructions is in a scripting language interpreted by the web browser at runtime.

12. The computer-readable medium of claim 1, wherein to determine the change in the position of the invisible element, the set of instructions causes the one or more processors to count the number of pixels by which the invisible element has moved.

13. The computer-readable medium of claim 1, wherein to reposition the graphical object within the pixel buffer, the set of instructions causes the one or more processors to re-render the graphical object in the pixel buffer at a new location.

14. The computer-readable medium of claim 1, wherein the invisible element is defined using an HTML div element having a substantially transparent background.

15. The computer-readable medium of claim 1, wherein the cursor is a mouse cursor.

16. A tangible non-transitory computer-readable medium storing thereon instructions that implement a graphical object management module configured to operate independently from a web browser that provides a pixel buffer to the graphical object management module, which the web browser displays via a user interface, wherein the graphical object management module, when executed on one or more processors to, is configured to:
cause the web browser to render a web page that includes the pixel buffer in a static position relative to the web page;
render a graphical object to the pixel buffer, wherein the web browser does not have direct access to the graphical object in the pixel buffer;
cause the web browser to generate an invisible element positionable in accordance with a cursor being positioned over the graphical object;
in response to the invisible element being repositioned, automatically reposition the graphical object within the pixel buffer in accordance with a change in the position of the invisible element, while the pixel buffer remains in a static position relative to the web page; and
remove the invisible element in response to determining that the cursor is no longer positioned over the graphical object.

17. The computer-readable medium of claim 16, wherein:
the web browser supports Document Object Model (DOM) objects,
the invisible element is appended to a DOM element that receives mouse events, touch events, or both, and
the pixel buffer is implemented as a canvas element.

18. The computer-readable medium of claim 17, wherein the graphical object management module operates in an Application Programming Interface (API) that provides an interactive digital map via the user interface.

19. The computer-readable medium of claim 16, wherein the graphical object management module is further configured to:
cause the web browser to generate the invisible element in response to determining that a mouse cursor is positioned over the graphical object,
begin repositioning the graphical object within the pixel buffer in accordance with the change in the position of the invisible element in response to receiving a mousedown event while the mouse cursor is positioned over the graphical object, and
stop repositioning the graphical object within the pixel buffer in response to receiving a mouseup event.

20. The computer-readable medium of claim 19, wherein the graphical object management module is further configured to:
subsequently to receiving the mouseup event, remove the invisible element in response to determining that the mouse cursor is no longer positioned over the graphical object.

21. The computer-readable medium of claim 19, wherein the graphical object is a first graphical object, and wherein the graphical object management module is further configured to:
subsequently to receiving the mouseup event, determine that the mouse cursor is no longer positioned over the graphical object, and
if the mouse cursor is positioned over a second graphical object, begin repositioning the second graphical object within the pixel buffer in accordance with a change in the position of the invisible element after receiving mousedown and mousemove events, or
if the mouse cursor is not positioned another graphical object, remove the invisible element.

22. The computer-readable medium of claim 19, wherein the graphical object management module is further configured to:
  in response to receiving the mousedown event, modify a z-order value of the invisible element so as to bring the invisible element above one or more elements within a container shared with the invisible element, and
  in response to receiving the mouseup event, modify the z-order value of the invisible element so as to bring the invisible element below the one or more elements.

23. A method in a computing device for supporting user interactions with graphical objects rendered as pixels to a pixel buffer, the method comprising:
  causing a web browser executing on the computing device to render a web page that includes a pixel buffer in a static position relative to the web page;
  rendering a feature to the pixel buffer;
  receiving an indication that a cursor is positioned over the feature while the contents of the pixel buffer and the web page are being displayed on a display device of the computing device;
  associating an invisible element with the feature, wherein the invisible element is repositioned in accordance with the cursor;
  repositioning the feature in the pixel buffer in accordance with a change in positioning of the invisible element as the positioning of the invisible element changes, while the pixel buffer remains in a static position relative to the web page; and
  removing the invisible element when the cursor is no longer positioned over the feature.

24. The method of claim 23, further comprising rendering a digital map, wherein the feature overlays the digital map.

25. The method of claim 23, wherein repositioning the feature in the pixel buffer includes:
  determining a number of pixels by which the invisible element has been repositioned, and
  repositioning the feature in the pixel buffer by the determined number of pixels, including re-rendering the feature at a new location.

26. A computing device comprising:
a user interface;
one or more processors; and
a computer-readable memory storing thereon:
  a pixel buffer;
  first instructions that, when executed on the one or more processors, implement a web browser that displays a web page that includes the pixel buffer in a static position relative to the web page and the contents of the pixel buffer via the user interface;
  second instructions that, when executed by the one or more processors, cause the one or more processors to:
    (i) render a graphical object to the pixel buffer, wherein the web browser does not have direct access to the graphical object in the pixel buffer,
    (ii) in response to detecting that a cursor is positioned over the graphical object displayed via the user interface, cause the web browser to create an invisible element positioned under the cursor, wherein the web browser automatically repositions the invisible element in accordance with a movement of the cursor,
    (iii) determine a change in the position of the invisible element,
    (iv) reposition the graphical object within the pixel buffer in accordance with the change in the position of the invisible element, while the pixel buffer remains in a static position relative to the web page, and
    (v) remove the invisible element when the cursor is no longer positioned over the graphical object.

* * * * *